United States Patent
Holl et al.

(10) Patent No.: US 7,538,237 B2
(45) Date of Patent: May 26, 2009

(54) PROCESS FOR HIGH SHEAR GAS-LIQUID REACTIONS

(75) Inventors: Richard A. Holl, Oxnard, CA (US);
Eric A. Gulliver, Camarillo, CA (US);
John L. Cihonski, San Jose, CA (US)

(73) Assignee: Kreido Laboratories, Camarillo, CA (US)

( * ) Notice: Subject to any disclaimer, the term of this patent is extended or adjusted under 35 U.S.C. 154(b) by 561 days.

(21) Appl. No.: 10/857,295

(22) Filed: May 28, 2004

(65) Prior Publication Data
US 2005/0033069 A1    Feb. 10, 2005

Related U.S. Application Data

(63) Continuation-in-part of application No. 09/894,996, filed on Jun. 27, 2001, now Pat. No. 6,742,774, which is a continuation-in-part of application No. 09/853,448, filed on May 10, 2001, now Pat. No. 6,723,999, and a continuation-in-part of application No. 09/802,037, filed on Mar. 7, 2001, now Pat. No. 6,471,392, and a continuation-in-part of application No. 09/345,813, filed on Jul. 2, 1999, now Pat. No. 6,391,082.

(60) Provisional application No. 60/214,538, filed on Jun. 27, 2000.

(51) Int. Cl.
*C07C 51/36* (2006.01)
*C07C 51/255* (2006.01)

(52) U.S. Cl. ........................... 554/141; 562/412

(58) Field of Classification Search .................. None
See application file for complete search history.

(56) References Cited

U.S. PATENT DOCUMENTS

| 591,494 A | 10/1897 | Pond |
| 2,261,257 A | 11/1941 | Kiesskalt et al. ............ 241/228 |

(Continued)

FOREIGN PATENT DOCUMENTS

| DE | 299 02 348 | 4/1999 |

(Continued)

OTHER PUBLICATIONS

Chem. Abstr. of Murthy, "Catalytic Hydrogenation of lauric oils and fatty acids", 1994, Proc. World Conf. Lauric Oils, pp. 72-77.*

(Continued)

*Primary Examiner*—Deborah D Carr
(74) *Attorney, Agent, or Firm*—Greenberg Traurig, LLP

(57) ABSTRACT

A process for performing a chemical reaction between a plurality of chemical reactants in the presence of a catalyst, with at least a first reactant in a liquid phase and at least a second reactant in a gas phase, the first and second reactants mixing at least by interdiffusion. The process comprises supplying the reactants to a passage defined by a first surface and a second surface and optionally moving at least one of the first surface and second surface relative to each other. The reactants their mixture or reaction products form respective boundary layers against the first and second surfaces and the radial spacing between the first surface and second surface is equal to or less than the back-to-back radial thicknesses of the boundary layers.

27 Claims, 4 Drawing Sheets

U.S. PATENT DOCUMENTS

| | | | |
|---|---|---|---|
| 2,295,740 A | 9/1942 | Keen | 261/93 |
| 2,314,598 A | 3/1943 | Phelan | 62/114 |
| 2,474,006 A | 6/1949 | Maycock | 261/83 |
| 2,577,247 A | 12/1951 | Irwin | 99/221 |
| 3,095,349 A | 6/1963 | Rich | 162/236 |
| 3,215,642 A | 11/1965 | Levy | 252/359 |
| 3,595,531 A | 7/1971 | Williams et al. | 259/7 |
| 3,841,814 A | 10/1974 | Eckhardt | 425/208 |
| 3,870,082 A | 3/1975 | Holl | 138/40 |
| 4,000,993 A | 1/1977 | Holl | 55/94 |
| 4,057,331 A | 11/1977 | Ong et al. | 350/285 |
| 4,071,225 A | 1/1978 | Holl | 366/114 |
| 4,073,567 A | 2/1978 | Lakerveld et al. | 350/6.5 |
| 4,174,907 A | 11/1979 | Suh et al. | 366/279 |
| 4,198,383 A | 4/1980 | Konsetov et al. | 422/134 |
| 4,251,576 A | 2/1981 | Osborn et al. | 428/331 |
| 4,287,075 A | 9/1981 | Fujiwara et al. | 501/135 |
| 4,306,165 A | 12/1981 | Kitabayashi et al. | 310/59 |
| 4,311,570 A | 1/1982 | Cowen et al. | 204/157.1 |
| 4,315,172 A | 2/1982 | Intichar et al. | 310/53 |
| 4,335,180 A | 6/1982 | Traut | 428/303 |
| 4,405,491 A | 9/1983 | Sando et al. | 252/359 |
| 4,556,467 A | 12/1985 | Kuhn et al. | 241/193 |
| 4,593,754 A | 6/1986 | Holl | 165/109.1 |
| 4,670,103 A | 6/1987 | Holl | 165/109.1 |
| 4,708,198 A | 11/1987 | Holl | 165/109.1 |
| 4,744,521 A | 5/1988 | Singer et al. | 241/66 |
| 4,769,131 A | 9/1988 | Noll et al. | 210/85 |
| 4,778,631 A | 10/1988 | Cobbs, Jr. et al. | 261/128 |
| 4,784,218 A | 11/1988 | Holl | 165/109.1 |
| 4,889,909 A | 12/1989 | Besecke et al. | 528/125 |
| 4,921,473 A | 5/1990 | Lee et al. | 494/27 |
| 4,930,708 A | 6/1990 | Chen | 241/65 |
| 4,983,307 A | 1/1991 | Nesathurai | 210/748 |
| 5,154,973 A | 10/1992 | Imagawa et al. | 428/325 |
| 5,198,137 A | 3/1993 | Rutz et al. | 252/62.54 |
| 5,204,416 A | 4/1993 | Mercer et al. | 525/390 |
| 5,212,278 A | 5/1993 | Pfandner | 528/171 |
| 5,227,637 A | 7/1993 | Herold et al. | 250/438 |
| 5,268,140 A | 12/1993 | Rutz et al. | 75/246 |
| 5,279,463 A | 1/1994 | Holl | 241/1 |
| 5,300,019 A | 4/1994 | Bischof et al. | 604/4 |
| 5,335,992 A | 8/1994 | Holl | 366/348 |
| 5,358,775 A | 10/1994 | Horn, III | 428/209 |
| 5,370,824 A | 12/1994 | Nagano et al. | 366/279 |
| 5,370,999 A | 12/1994 | Stuart | 435/99 |
| 5,391,603 A | 2/1995 | Wessel et al. | 524/396 |
| 5,395,914 A | 3/1995 | Wilharm et al. | 528/125 |
| 5,449,652 A | 9/1995 | Swartz et al. | 501/134 |
| 5,471,037 A | 11/1995 | Goethel et al. | 219/750 |
| 5,484,647 A | 1/1996 | Nakatani et al. | 428/209 |
| 5,506,049 A | 4/1996 | Swei et al. | 428/323 |
| 5,523,169 A | 6/1996 | Rafferty et al. | 428/551 |
| 5,538,191 A | 7/1996 | Holl | 241/1 |
| 5,552,210 A | 9/1996 | Horn, III et al. | 428/209 |
| 5,554,323 A | 9/1996 | Tsukimi et al. | 264/4.7 |
| 5,558,820 A | 9/1996 | Nagano et al. | 264/4.1 |
| 5,576,386 A | 11/1996 | Kempter et al. | 526/88 |
| 5,658,485 A | 8/1997 | Cava et al. | 252/62.9 |
| 5,658,994 A | 8/1997 | Burgoyne, Jr. et al. | 525/390 |
| 5,659,006 A | 8/1997 | White | 528/212 |
| 5,674,004 A | 10/1997 | Takeuchi | 366/69 |
| 5,693,742 A | 12/1997 | White et al. | 528/212 |
| 5,739,193 A | 4/1998 | Walpita et al. | 524/413 |
| 5,754,936 A | 5/1998 | Jansson | 419/10 |
| 5,855,865 A | 1/1999 | Lambert et al. | 424/9.52 |
| 5,874,516 A | 2/1999 | Burgoyne, Jr. et al. | 528/219 |
| 5,929,138 A | 7/1999 | Mercer et al. | 523/220 |
| 5,974,867 A | 11/1999 | Forster et al. | 73/61.41 |
| 5,998,533 A | 12/1999 | Weber et al. | 524/540 |
| 6,039,784 A | 3/2000 | Luk | 75/231 |
| 6,040,935 A | 3/2000 | Michalicek | 359/198 |
| 6,074,472 A | 6/2000 | Jachow et al. | 106/436 |
| 6,093,636 A | 7/2000 | Carter et al. | 438/623 |
| 6,134,950 A | 10/2000 | Forster et al. | 73/54.01 |
| 6,143,052 A | 11/2000 | Kiyokawa et al. | 75/230 |
| 6,176,991 B1 | 1/2001 | Nordman | 204/601 |
| 6,190,034 B1 | 2/2001 | Nielsen et al. | 366/336 |
| 6,281,433 B1 | 8/2001 | Decker et al. | 174/35 |
| 6,391,082 B1 | 5/2002 | Holl | 75/230 |
| 6,464,936 B1 | 10/2002 | Mowat et al. | 422/22 |
| 6,471,392 B1 | 10/2002 | Holl et al. | 366/279 |
| 2001/0030295 A1 | 10/2001 | Holl | 250/492.23 |
| 2002/0038582 A1 | 4/2002 | Holl | 75/230 |
| 2002/0078793 A1 | 6/2002 | Holl | 75/230 |
| 2002/0089074 A1 | 7/2002 | Holl | 261/92 |
| 2002/0148640 A1 | 10/2002 | Holl | 174/256 |
| 2003/0043690 A1 | 3/2003 | Holl | 366/279 |
| 2003/0066624 A1 | 4/2003 | Holl | 165/47 |

FOREIGN PATENT DOCUMENTS

| | | | | |
|---|---|---|---|---|
| DE | 299 19 570 | 1/2000 | | |
| EP | 0 219 357 | 4/1987 | | |
| EP | 0 660 336 | 6/1995 | | |
| GB | 891 152 | 3/1962 | | |
| GB | 1 232 644 | 5/1971 | | |
| GB | 1 252 192 | 11/1971 | | |
| GB | 2 192 558 | 1/1988 | | |
| JP | 58 144549 | 8/1983 | | |
| JP | 3 279991 | 12/1991 | | |
| JP | 11322920 | 11/1999 | | |
| JP | 2000-213876 | 8/2000 | | |
| SU | 369 939 | 4/1973 | | 241/1 |
| SU | 957 991 | 9/1982 | | 241/301 |
| SU | 1 737 241 | 5/1992 | | |
| WO | WO 97 12665 | 4/1997 | | |
| WO | WO 97 42639 | 11/1997 | | |
| WO | WO 98 49675 | 11/1998 | | |
| WO | WO 02 071451 | 9/2002 | | |
| WO | WO 03 022415 | 3/2003 | | |

OTHER PUBLICATIONS

PCT International Search Report for PCT/US00/18038, Holl Technologies Company, completed Sep. 17, 2000, mailed Oct. 6, 2000.
PCT International Search Report for PCT/US01/15258, Holl Technologies Company, completed Jan. 24, 2002, mailed Feb. 1, 2002.
PCT International Search Report for PCT/US01/20635, Holl Technologies Company, completed Jan. 24, 2002, mailed Feb. 1, 2002.
PCT International Search Report for PCT/US01/23657, Holl Technologies Company, completed Apr. 25, 2002, mailed May 6, 2002.
PCT International Search Report for PCT/US02/11575, Holl Technologies Company, completed Jul. 12, 2002, mailed Aug. 6, 2002.
PCT International Search Report for PCT/US02/29093, Holl Technologies Company, completed Mar. 6, 2003, mailed Mar. 17, 2003.
PCT International Search Report for PCT/US02/31076, Holl Technologies Company, completed Dec. 11, 1002, mailed Dec. 27, 2002.
PCT International Search Report for PCT/US02/05361, Holl Technologies Company, completed May 17, 2002, mailed Jun. 5, 2002.
US 6,159,264, Dec. 2000, Holl (withdrawn).
www.pooleplastics.com/production.html, Poole Plastics and Tooling Company, Production Capabilities; Feb. 15, 2001.
Zlotorzynski; "The Application of Microwave Radiation to Analytical and Environmental Chemistry;" Critical Reviews in Analytical Chemistry; vol. 25, No. 1; pp. 43-76; 1995.
"Microwave Heating Mechanisms;" Microwave Chemistry.
"A Basic Introduction to Microwave Chemistry;" Microwave Chemistry.
"Fast and Furious;" Microwave Chemistry.
"Microwave Heating Applied to Polymers;" Microwave Chemistry.
"Application of Microwaves to Organic Chemistry;" Microwave Chemistry.

"Microwave Chemistry in Liquid Media;" Microwave Chemistry.

"Microwave Heating and Intercalation Chemistry;" Microwave Chemistry.

US 6,159,264, 12/2000, Holl (withdrawn)

* cited by examiner

PROCESS FOR HIGH SHEAR GAS-LIQUID REACTIONS

CROSS REFERENCE TO RELATED APPLICATIONS

This application is a continuation-in-part of U.S. application Ser. No. 09/894,996, filed Jun. 27, 2001, now U.S. Pat. No. 6,742,774 which is a continuation-in-part of U.S. application Ser. No. 09/853,448, filed on May 10, 2001, now U.S. Pat. No. 6,723,999, and a continuation-in-part of U.S. application Ser. No. 09/802,037, filed on Mar. 7, 2001, now U.S. Pat. No. 6,471,392, and a continuation-in-part of U.S. application Ser. No. 09/345,813, filed on Jul. 2, 1999, now U.S. Pat. No. 6,391,082, and which claims the benefit of the prior filing date of U.S. Provisional Application No. 60/214,538, filed Jun. 27, 2000, and also of U.S. Provisional application Ser. No. 10/661,170 filed Sep. 11, 2003, which claims the benefit of the prior filing date of U.S. provisional patent application No. 60/410,185, filed Sep. 11, 2002, herein incorporated by reference in their entirety.

BACKGROUND OF THE DISCLOSURE

1. Field of the Disclosure

The present disclosure relates to materials processing involving a chemical and/or a physical action(s) or reaction(s) of a component or between components. More specifically, the present disclosure produces a gas-in-liquid emulsion in a reactor to continuously process relatively large quantities of materials.

2. General Background and State of the Art

Apparatus for materials processing consisting of coaxial cylinders that are rotated relative to one another about a common axis, the materials to be processed being fed into the annular space between the cylinders, are known. For example, U.S. Pat. No. 5,370,999, issued 6 Dec. 1994 to Colorado State University Research Foundation discloses processes for the high shear processing of a fibrous biomass by injecting a slurry thereof into a turbulent Couette flow created in a "high-frequency rotor-stator device", this device having an annular chamber containing a fixed stator equipped with a coaxial toothed ring cooperating with an opposed coaxial toothed ring coupled to the rotor. U.S. Pat. No. 5,430,891, issued 23 Aug. 1994 to Nippon Paint Co., Ltd. discloses processes for continuous emulsion polymerization in which a solution containing the polymerizable material is fed to the annular space between coaxial relatively rotatable cylinders.

U.S. Pat. No. 5,279,463, issued 18 Jan. 1994, and U.S. Pat. No. 5,538,191, issued 23 Jul. 1996, both having the same applicant as the present disclosure, disclose methods and apparatus for high-shear material treatment, one type of the apparatus consisting of a rotor rotating within a stator to provide an annular flow passage. U.S. Pat. No. 5,538,191, in particular, at column 13, line 37, describes using the disclosure as a gas/liquid chemical reactor by enveloping the greater part of the liquid that clings to the periphery of the spinning rotor with a body of the reactant gas. The high peripheral velocity of the wetted, spinning rotor causes the gas to be in a highly turbulent state of surface renewal at its contact interface with the liquid film. However, this gas/liquid reaction method provides a relatively small gas/liquid contact area and is prone to considerable back-mixing (mixing in the longitudinal, axial or general flow direction) of the gas component thus providing an undesirably large residence time distribution (RTD), impairing the overall efficiency of the process.

Sparging gasses through liquids for reacting the gasses with the liquids is also known in the prior art, but also fails to provide adequate interfacial contact area between the liquid and gas.

It would be desirable to provide a large interfacial contact area between a liquid and a gas in an efficient continuous or batch type process.

SUMMARY OF THE DISCLOSURE

According to a first aspect, a process for performing a chemical reaction between a plurality of chemical reactants in the presence of a catalyst, is disclosed. In the process at least a first reactant is in a liquid phase and at least a second reactant is in a gas phase.

The process comprises: supplying the first reactant and the second reactant in passage defined by a first surface and a second surface, the first reactant supplied in the passage in a first reactant flow and the second reactant supplied in the passage in a second reactant flow and the first reactant mixes with the second reactant at least by interdiffusion.

In the process, the first reactant, the second reactant, any mixture and reaction products thereof, form a respective boundary layers against the first and second surfaces with a radial spacing between the first surface and second surface being equal to or less than a back-to-back radial thickness of the boundary layers.

In the process, the first reactant reacts with the second reactant in the passage.

According to a second aspect, a process for performing a chemical reaction, between a first reactant and a second reactant in the presence of a catalyst, is disclosed. In the process, the first reactant is in a liquid phase and the second reactant is in a gas phase.

The process comprises: supplying the first reactant and the second reactant in passage defined by a first surface and a second surface, the first reactant reacting with the second reactant in the passage.

In the process first reactant is supplied in the passage in a first reactant flow and the second reactant supplied in the passage in a second reactant flow and the first reactant mixes with the second reactant at least by interdiffusion.

In the process, the first reactant, the second reactant, any mixture and reaction products thereof, forming respective boundary layers against the first and second surfaces, a radial spacing between the first surface and second surface being equal to or less than a back-to-back radial thickness of the boundary layers.

According to a third aspect a process for performing a chemical reaction between a first reactant and a second reactant in the presence of a catalyst, is disclosed. In the process, the first reactant is in a liquid phase and the second reactant is in a gas phase.

The process comprises: introducing the first reactant and the second reactant in an apparatus comprising a first surface and a second surface able to move relative to each other and moving at least one the first surface and the second surface relative to each other.

In the apparatus the first surface and second surface defines a passage and the first reactant reacts with the second reactant in the passage. The first reactant, the second reactant, any mixture or products thereof form a respective boundary layer against the first and second surfaces and a radial spacing between the first surface and second surface is equal to or less than a back-to-back radial thickness of the boundary layers.

According to a fourth aspect, a process for performing a chemical reaction between a plurality of chemical reactants in presence of a catalyst, is disclosed. In the process at least one reactant is in a liquid state and at least one reactant being in a gas state.

The process comprises: introducing the at least one first reactant and the at least one second reactant in an apparatus comprising a first surface and a second surface able to move relative to each other, and moving at least one the first surface and the second surface relative to each other.

In the process the first surface and second surface define a passage, the at least one first reactant reacting with the at least second reactant in the passage, the first reactant, the second reactant any mixture and reaction products thereof forming respective boundary layers against the first and second surfaces, a radial spacing between the first surface and second surface being equal to or less than a back-to-back radial thickness of the boundary layers Preferably the catalyst is introduced in a solid state.

Preferably the process further comprises moving the at least on of the first surface and second surface relative to the other. In a second preferred embodiment of the process according to the first and second aspects the radial spacing between the first surface and the second surfaces in the passage ranges from a first radial spacing to a second radial spacing, the first radial spacing greater than the second radial spacing.

Preferred reactions are hydrogen peroxide synthesis, wherein the first reactant comprises a solution of DI H20 and the second reactant comprises oxygen and hydrogen gases, p-xylene oxidation wherein the first reactant being p-xylene in a solution with a suitable solvent, preferably water, and the second reactant is oxygen; and hydrogenation of an unsaturated fat, wherein the first reactant is an oil comprising an unsaturated fatty acid and the second reactant is hydrogen.

Accordingly, a method and apparatus are disclosed, the method and apparatus for producing a gas-in-liquid emulsion for providing increased interfacial contact area between the liquid and the gas for improved reaction of the gas with the liquid, or more rapid solution or reaction of a difficulty soluble or immiscible gas in or with a liquid.

The method provides a superior, more economical and more efficient way of contacting gases with liquids for the purpose of effecting reactions between them to be carried out as a continuous or batch type process.

DETAILED DESCRIPTION OF THE DISCLOSURE

Figure 1:
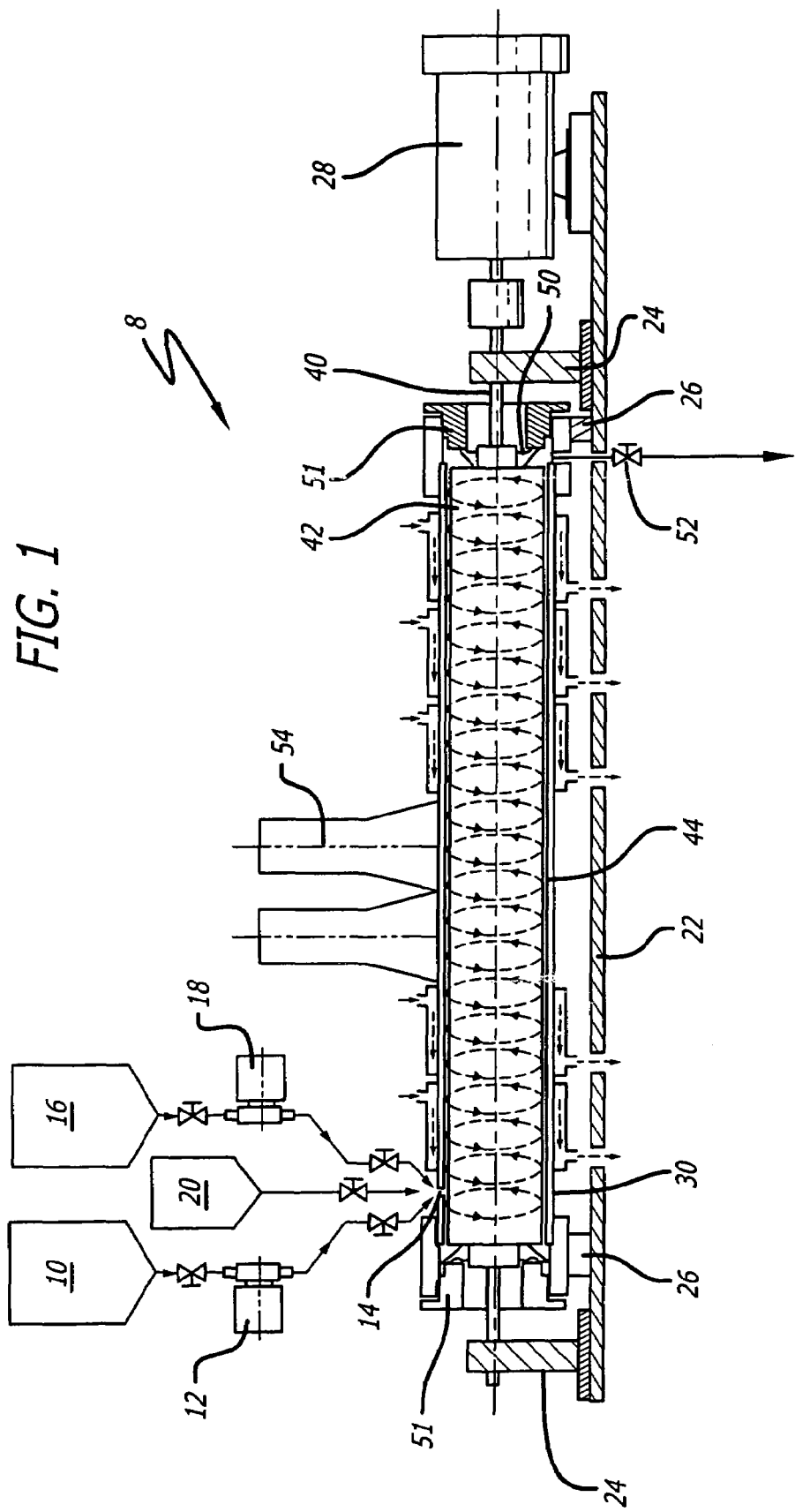
FIG. 1 is a part elevation, part longitudinal cross sectional view of a complete reactor of the present disclosure.

An efficient reaction process is herein disclosed between reactants, wherein the reactants and a catalyst may be in different states, such as gas, liquid and solid. Accordingly, two or more reactants can be reacted in presence of a catalyst in a 3-phase system, wherein at least one first reactant is in a liquid phase, and at least one second reactant is in a gas phase, while the catalyst can be in a solid phase, such as a powder or a paste.

The first reactant and the second reactant can be preheated to a predetermined reaction temperature, while the catalyst may or may not be preheated. In the reactions discussed below, the catalyst is preferably not preheated. Therefore, depending on the parameters, pre-heating of any of the components may or may not be necessary. In addition to other parameters, the temperature can be controlled to optimize the reactions.

The first reactant and second reactant are introduced into the system in a passage defined by a first and a second surface. The catalyst can be introduced as an additional stream or be included with one of the reactants coming in contact with the first and second reactants to promote the reaction. The first and second reactant material mix at least by interdiffusion. The first and the second reactant materials, and material resulting from interdiffusion and any consequent reaction of the materials, form respective boundary layers against both surfaces. The radial spacing between the two surfaces in the passage is equal to or less than the back-to-back radial thicknesses of the two laminar boundary layers of material against the two surfaces, and if larger than the back-to-back radial thicknesses with a third layer between the two boundary layers, the third layer is too thin to support turbulent convection or, uneven channeling.

The flow rates of the materials in the flow path are such that they are subjected to laminar shear at the value required for the interdiffusion.

In a preferred embodiment, the first and second surfaces are able to move relative to each other. In this embodiment, at least one of the first and second surfaces moves relatively to the other at least during mixing of the first reactant with the second reactant. The relative movement of the first and second surfaces results in the creation of a highly sheared volume of the first and second reactant materials. The atoms of the first reactant and the atoms of the second reactant are maximally exposed to each other and to the catalyst.

In the embodiment where at least one of the two surfaces moves relative to the other, the process is more preferably carried out in the apparatus described herein, in particular in a reactor wherein the first and second surfaces are the surfaces of a stator and a rotor, and the first and second reactant are introduced into the gap between the surfaces of the stator and rotor.

As discussed herein, the stator and rotor surfaces have a smoothness such that formation of Taylor vortices during mixing of the reactants in the processing passage is inhibited.

A reactor 8 is illustrated by FIGS. 1-4, and described in greater detail in U.S. patent Ser. No. 09/802,037 entitled "Method and Apparatus for Materials Processing", filed Mar. 7, 2001 and U.S. Pat. No. 5,538,191 entitled "Methods and Apparatus for High-Shear Material Treatment" both of which are hereby incorporated by reference in their entirety. An annular cross section processing chamber 44 having an annular gap is formed between an outer cylindrical member or cylindrical tube 30 comprising a stator and a cylindrical rotor or inner cylindrical member 42. Liquid and gas enter the processing chamber 44 through inlets 14. The cylindrical members 30, 42 rotate relative to each other producing a shear force on the liquid, gas and any other reactants as they are pumped through the processing chamber and out an outlet 52 at the downstream end of the processing chamber 44.

Figure 2:
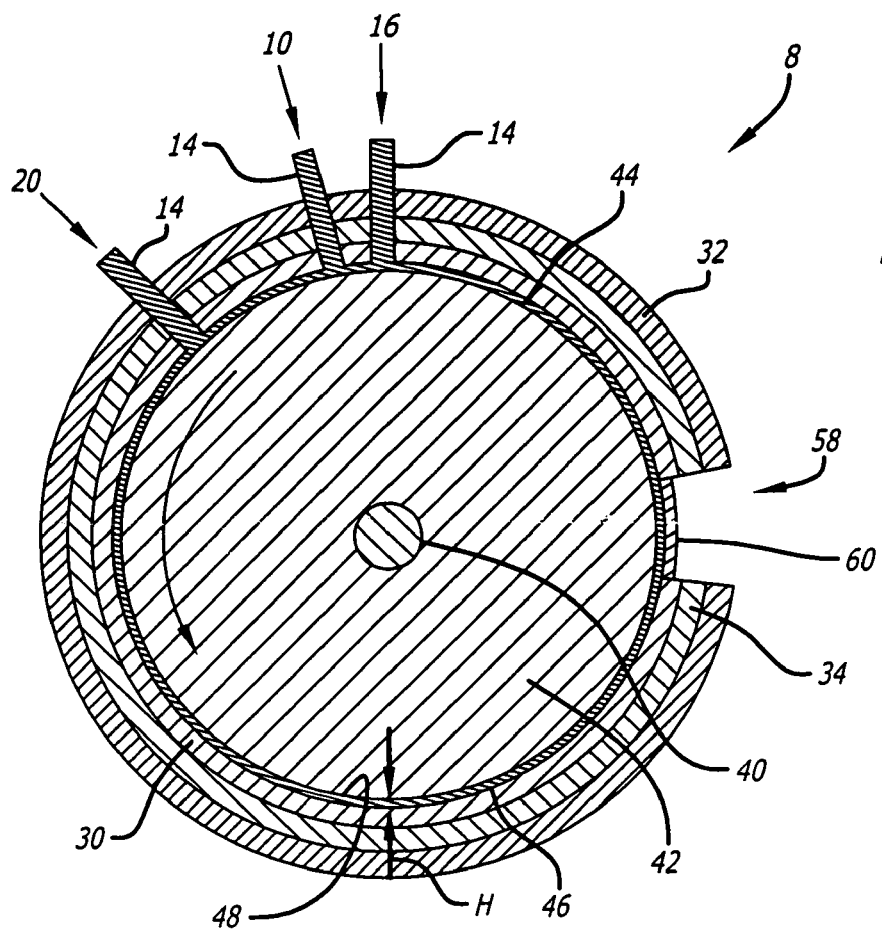
FIG. 2 is a transverse cross-sectional view of a reactor showing the cylindrical members in a concentric configuration with gas and liquid inlets leading to the processing chamber.
Figure 6:
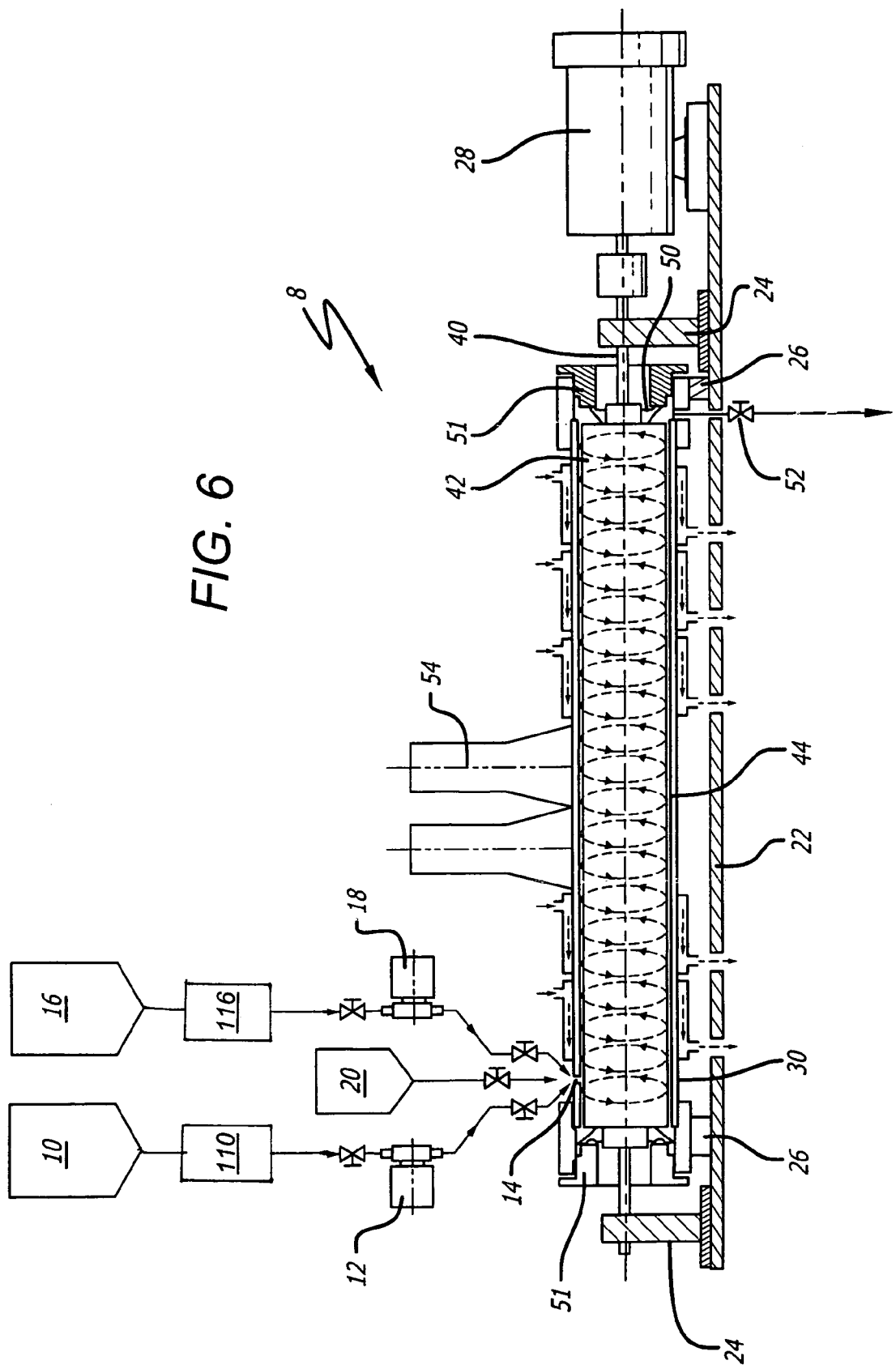
FIG. 6 is representation of part of the disclosure.

Turning to FIGS. 1, 2 and 6 in particular, reactants are fed from supply tanks 10, 16, 20, respectively. Before being introduced in the system reactants can be heated in a heater such as heater 110 and 116. Also shown are metering pumps 12 and 18 leading from the supply tanks 10, 16 and into the inlet 14. The reactants can be aqueous solutions and a gas such as carbon dioxide. The reaction can occur at room temperature and atmospheric pressure for example, although other temperatures and pressures can be chosen as appropriate.

The reactor comprises a baseplate 22 on which is mounted rotor bearing supports 24, stator supports 26 and a variable speed electric drive motor 28. The cylindrical member 30, comprising the apparatus stator, is mounted on the supports 24. A rotor shaft 40 extends between the supports 24 and is supported thereby, one end of the shaft being connected to the motor 28. The shaft 40 carries the cylindrical member 42, comprising the apparatus rotor. The processing chamber 44 is formed between the inner cylindrical surface 46 of the cylindrical member 30 and the outer cylindrical surface 48 of rotor 42 and face body 51. The ends of the chamber are closed against leakage by end seals 50 that surround the shaft 40.

In the embodiment of FIGS. 1 and 2, the cylindrical member 42 is shown with its axis of rotation roughly coincident, or concentric, with the longitudinal axis of the cylindrical member 30. The processing chamber 44 is shown having a radial dimension of H.

Figure 3:
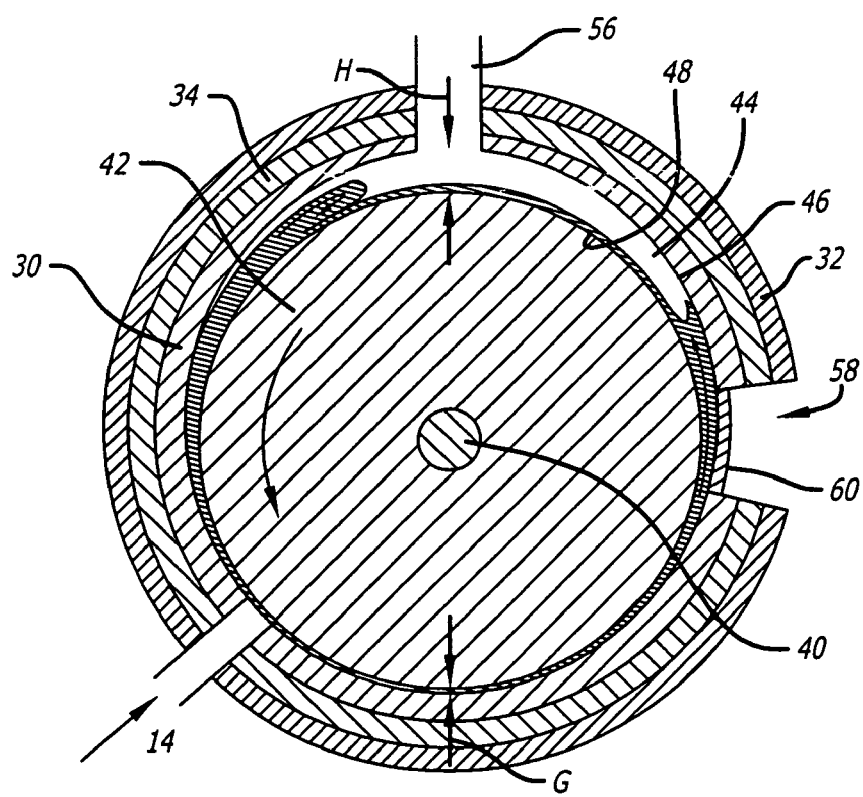
FIG. 3 is a cross-sectional view of an eccentrically mounted embodiment of the reactor in which the longitudinal axes of the cylindrical members are displaced to give an annular passage that varies in radial width around its circumference, the reactor including a series of gas inlets along its length.
Figure 4:
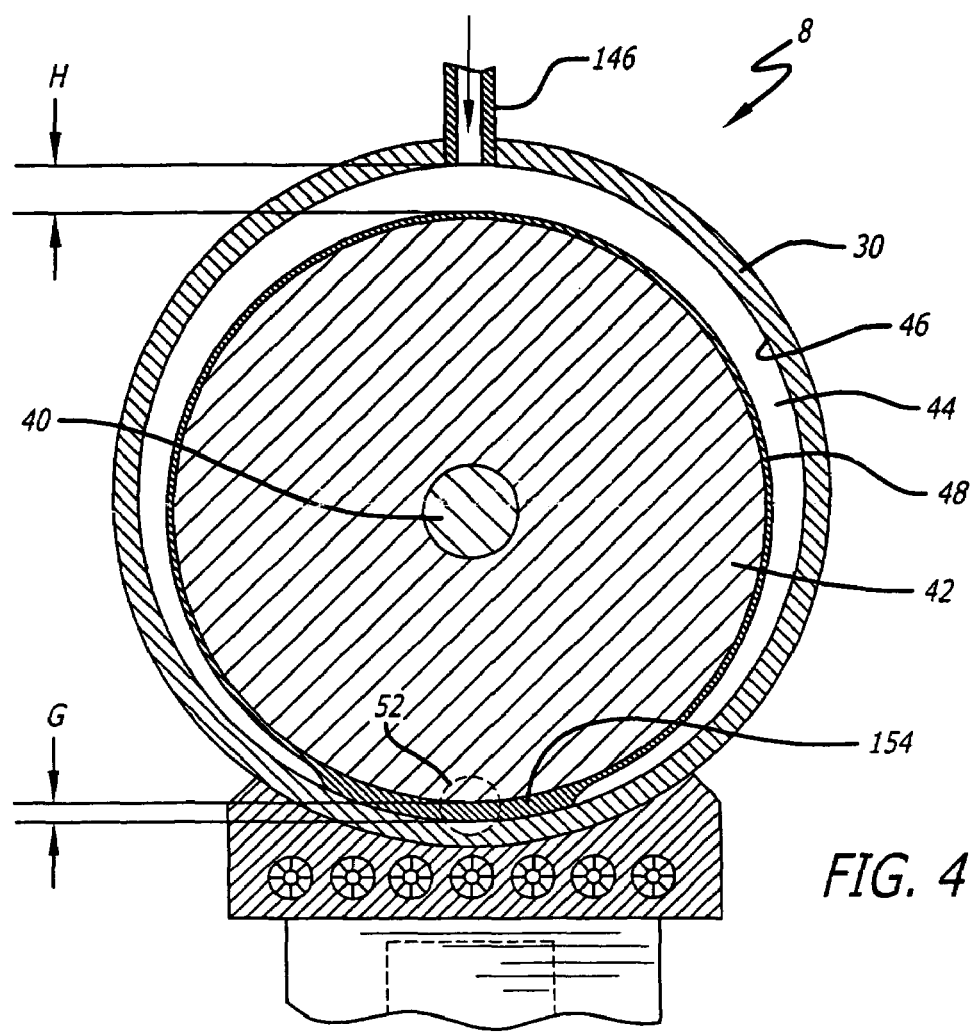
FIG. 4 is a cross sectional view of an eccentrically mounted embodiment of the reactor similar to FIG. 3, but showing a gas inlet at the top of the reactor and fluid inlets along the bottom of the reactor.
Figure 5:
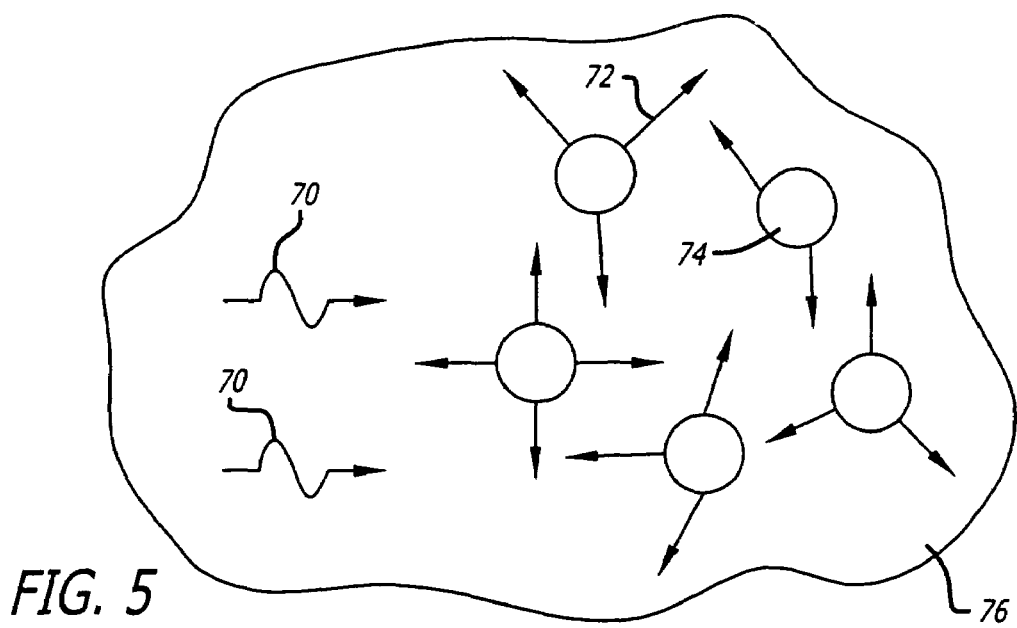
FIG. 5 is a diagrammatic representation of the gas-in-liquid emulsion further illustrating incident white light and light scattered by the gas bubbles.

In another embodiment, as illustrated in FIGS. 3 and 4 for example, the cylindrical member 42 has its axis of rotation not coincident with, but rather eccentric, relative to the longitudinal axis of the cylindrical member 30. The processing chamber 44 has a smaller radial dimension G and a larger radial dimension H diametrically opposite. The processing chamber 44 is therefore circumferentially alternately convergent from the portion having the dimension H to the portion having the dimension G at which portion the surfaces 46, 48 are spaced a minimum distance apart and the maximum shear is obtained in the flowing material; the chamber 44 is then divergent from the portion having the dimension G to the portion having the dimension H.

Rather than the horizontal orientation of FIG. 1, the reactor can be configured vertically with the outlet 52 at the top. Other orientations can be used as well. Also, other inlet and outlet configurations can be used. For example, in FIG. 3 a series of inlets 14 positioned along the length of the reactor 8 and passing through the cylindrical member 30 supply gas into the processing chamber 44. FIG. 4 shows an embodiment in which both the inlet (not shown) and outlet 52 are disposed at the lowermost part of the cylindrical member 30, while the gas is fed into the processing chamber 44 by a separate inlet 146. In a general embodiment, the reactants are pumped into the inlets 14, through the processing chamber 44 and out an outlet. The inlets 14 and outlets 52 can be at opposite ends of the length of the processing chamber 44 to allow mixing and reacting along the length of the processing chamber 44.

U.S. Provisional Application No. 60/214,538 entitled "Process for High Shear Gas-Liquid Reactions" filed on Jun. 27, 2000, which is hereby incorporated by reference in its entirety, describes the use of the reactor 8 for gas/liquid reactions. The reactor emulsifies the gas into the liquid providing increased contact between the liquid and gas for more efficient reactions. A gas-in-liquid emulsification can be created by narrowing the radial dimension between the surfaces 46, 48 of the processing chamber 44 while rapidly rotating the rotor cylindrical member 42 relative to the stator cylindrical member 30.

For the gas-in-liquid emulsification to occur, the radial dimension between the surfaces 46 and 48 of the processing chamber 44 should be approximately equal to or less than the combined thickness of the two laminar boundary layers. As the material being processed flows in the processing chamber 44, a respective boundary layer forms on each of the surfaces 46 and 48, the thickness of which is determined by the viscosity and other factors of the material being processed and the relative flow velocity of the material over the surface. The laminar boundary layer for a fluid flowing over a flat surface along a path length x, which in the disclosure is taken as one circumferential flow length around the rotor surface, may be determined by the equation:

$$\delta = \frac{4.91}{\sqrt{N_R}}$$

where $N_{RX}$ is the product of length x and the flow velocity divided by the kinematic viscosity.

In addition to having a radial dimension requirement, the peripheral speed of the rotor cylindrical member 42 relative to the stator cylindrical member 30 should exceed approximately four meters per second for the gas-in-liquid emulsification to occur. The upper limit on the peripheral speed is determined by the application. For example, too great a speed might destroy living microbes or long molecular chains. Also, too great a speed can subject the reactor 8 to unnecessary stress and strain.

The required radial dimension and peripheral speed can vary depending on conditions. The radial dimension requirement and peripheral speed required for the onset of the emulsification phenomenon can be determined experimentally for given reactants under specified conditions. The onset of this emulsification phenomenon is indicated by the appearance of a white colored turbidity of the fluid agitated in the processing chamber 44. The stator cylindrical member 48 can, for observation purposes, be made of glass.

The grayish-white to white, almost milk like turbidity supply energy into the processing chamber 44 through a port 58 and window 60 as illustrated in FIGS. 2 and 3. This use of energy is described in greater detail in U.S. patent Ser. No. 09/853,448 entitled "Electromagnetic Wave Assisted Chemical Processing" by Holl filed May 10, 2001 which is hereby incorporated by reference in its entirety. The energy can also be used to create or facilitate additional reaction capabilities.

Also, the cooperating surfaces 46 and 48 in FIGS. 2 and 3 can be coated with a catalyst to facilitate a chemical or biological reaction that constitutes the processing step. The catalytic material can enhance chemical, bio-chemical or biocidal reactions in the processing passage.

The reactor 8 can be quickly and thoroughly cleaned. Deposits forming and blocking the irradiation are generally not a problem. For example, even if the reactant is a sticky opaque substance, the surfaces 46, 48 and window 60 are easily cleaned. By running the reactor 8 with clean water for enough time for the water to pass from the inlet 14 to the outlet 52, substances clinging to the surfaces 46, 48 and the window 60 are generally washed away. In most cases the surfaces of the processing chamber 44 are clean within five seconds. This efficient cleaning ability is due to the extremely hard shear forces created by the rotor cylindrical member 42 and stator cylindrical member 30 rotating relative to each other. In most cases, no contaminants will even form on the window 60 or surfaces 46, 48 of the processing chamber 44 due to the hard shear forces on pulling the materials moving through the reactor 8.

The gas/liquid reaction can be used in an oxygenation process, or an enzyme reaction process, as examples. Additionally, solids, such as catalytic powders, can be added to the processing chamber 44 to form a gas/liquid/solid emulsion to provide a gas/liquid/solid reaction which can also be enhanced by the application of electromagnetic or longitudinal pressure energy as described below.

As more fully described in other sections of this description, the first and second reactants are mixed by relative movement of the stator and rotor at a relative speed rate to create a highly sheared volume, resulting in the atoms of the first reactant and the atoms of the second reactant receiving maximum exposure to each other and to the catalyst, thereby increasing reactivity. In particular, dissolution or emulsification of the gas into the liquid quickly makes a large total surface area of the gas available for the reaction with the other components.

The time for the diffusion of the gas in the liquid is reduced to a very short period. Since, in reactions between reactants in gas and liquid phases, the rate limiting step is the transport of the gas through the liquid to the reaction site, the increase in the ability of the gas to dissolve into the liquid and reach the reactant in the liquid phase because of the shearing, results in an increase in the efficiency of the reaction.

Additionally, the apparatus allows de-coupling and separate control of the key parameters controlling the effectiveness of the reaction, such as control of the temperature and flow rate of each reactant into the system. Accordingly, the efficiency of the reaction is greatly improved, even to the point that a reaction can be carried out in an equilibrium condition.

In the system herein disclosed, the reaction rate is therefore finely controllable; for example, by controlling the flow rate, temperature, pressure and/or other parameters of the first and second reactants in the passage, and of additional compounds introduced into the system. In this way, the residence time, the exposure of the compounds to each other in the reaction, the temperature of the reactants before and during the desired reaction, as well as other commonly understood parameters, can be controlled. Temperature can be controlled very rapidly to the desired conditions. Analogously, the flow rate of the first reactant and the flow rate of the second reactant can be variably controlled to create the desired reaction conditions.

Referring to FIGS. 2 and 3, the first and second reactants are introduced into the apparatus through the inlets shown. In particular, the reactants can be introduced through inlets (14), (10), (16) and/or (20). The reactants may be run through a pre-heater, such as heaters 110 and 116, to bring the temperature of the reactants to the desired temperature of reaction.

The catalyst can be introduced through an inlet or side port or can be introduced together with a reactant into the feed stream. The catalyst can be introduced as a paste formed by a mixture of a viscous fluid compatible with the reaction and having a consistency at room temperature such that it keeps the catalytic particles from falling out. The catalyst can be introduced into the reactor also as a powder or a coating on the surfaces of the stator and/or rotor. The catalyst may be in a heterogeneous form so that during mixing of the first and second reactants the catalyst disperses rapidly into the reaction mixture in a dispersed form.

The first reactant and second reactant are introduced into the reactor in proper stoichiometric amounts. The amounts are identifiable by a person skilled in the art in view of such factors as the reactant employed, the reactor configuration and operating characteristics, such as stator diameter, rotor/stator gap, working length and reactor volume.

The main reactant is usually introduced first, preferably near the very head end of the rotor to have material flooding around the tip of the rotor to reduce air bubble formation. The other reactants and the catalyst can be introduced through inlets placed downstream. In the apparatus of FIGS. 3 and 4, one other reactant is preferably introduced through an inlet placed in communication with gap G, for mixing of the main reactant in the narrow gap. However, it is also possible to introduce the reactants at the back of the reactor and allow them to flow toward the head. In this embodiment, the main reactant is introduced closest to the back of the reactor and additional reactants are added downstream.

The optimal flow rate of each reactant is dependent on the reactor configuration and characteristics. The various parameters, such as temperature and pressure, and others such as those discussed above, are adjusted to maintain the stoichiometry of the reaction.

The residence time of the reactants in the reactor is a function of the flow rate and reactor dimension and can be tailored to the desired reaction rate. In any case, in view of the ability to separately control the reaction parameters in the system, the residence time to achieve completion of the reaction can be reduced to ranges of seconds.

The temperature in the reactor during the reaction can be controlled by the transducers (54) and use of a heat exchange medium as discussed herein.

Exemplary representative reactions that can be performed in the system herein disclosed are hydrogenation of fatty acids, including hydrogenation of vegetable oil, p-xylene oxidation, aldehyde oxidation and hydrogen peroxide synthesis.

Hydrogenation

With respect to the hydrogenation reaction, unsaturated fats are introduced as a first reactant in the reactor as a liquid component, such as vegetable oil. Other materials can by hydrogenated in the process herein described; for example, unsaturated carbon compounds such as acetylenes or olefins; nitrogen compounds such as imines, nitroso compounds nitro compounds or nitriles; carbonyl compounds such as carboxyilic acids, esters, aldhydes and ketones; and aromatic compounds such as benezene or phenols.

Hydrogen gas is introduced into the reactor as a second reactant. Hydrogen can be supplied by disproporationation reactions occurring between reactants in the system.

The catalyst is usually provided in the form of a paste, but can also be provided in other forms. For hydrogenation of fats and oils, the preferred catalyst is finely divided nickel, or occasionally copper. Hydrogenation of other compounds normally involves catalysts based on platinum group metals such as nickel, palladium, platinum, ruthenium, rhodium, osmium, or irridium. The catalyst can be finely divided or supported on the surface of another material such as carbon, alumina or barium sulfate to name a few.

Catalysts delivered as particles are also referred to as heterogeneous catalysts. Dissolved catalysts are also referred as homogeneous catalysts. A heterogeneous catalyst can be delivered as a metal containing compound dissolved in a solution. A homogeneous catalyst can be associated with ligands that alter the catalyst's behavior (e.g., make it possible to preferentially catalyze specific types of bonds or produce a specific chiral product). In any case both heterogeneous and homogeneous catalysts can be used in the process for performing a chemical reaction of the type herein disclosed.

The catalyst is provided through one of the inlets of the system. The inlets used to introduce the reactants and the catalyst are preferably close to each other, for example in a space ranging up to 0.5 inches.

The unsaturated fat source and the hydrogen are preferably pre-heated to a predetermined temperature, which usually constitutes the desired temperature of the reaction. Temperatures can be varied in a range that spans from the traditionally used reaction temperature up to a very high temperature. For example, gas and vegetable oil can be pre-heated to a temperature that is in a range of 100° C. to 240° C.

The first and second reactants are then introduced into the reactor. As a first reactant, the oil is preferably introduced first through an inlet preferably located at the head of the rotor, while the hydrogen and catalyst are preferably introduced through inlets downstream, which are aligned along the reactor.

For a reactor having a working volume of 1.36 milliliters, the flow rate of hydrogen ranges from approximately 0.05 standard liters per minute up to about 3 standard liters per minute. The flow rate of oil ranges from about 0.3 ml/min up to about 4.0 ml/min. The catalyst can have a flow rate ranges from approximately 0.002 ml/min to approximately 0.6 ml/min. Pressure is usually between about 15 and 30 psi.

For example, in such a reactor, if the gas flow rate is about 0.05 to 3 standard milliliters per minute, the corresponding oil flow rate would be approximately 0.3 ml/min to 8 ml/min.

Accordingly, with an oil flow rate of about 4 milliliters per minute, the gas flow rate could range from approximately 0.69 ml/min to 1.38 ml/min. For an approximate 1 milliliter per minute oil flow rate, the gas flow rate would range from approximately 0.2 up to 0.35 milliliters per minute.

Reactors with different working volumes would require an adjustment of the parameters. The gas flow rate would increase commensurate with the oil flow rate and the reactor volume in an approximate linear expansion to maintain steoichiometry. For example, if a reactor has a working volume of 1.36 milliliter and the hydrogen gas flow rate is 1 liter a minute and the oil flow rate is 2.6 milliliters a minute, a reactor having a working volume of about 7 milliliters would have the two flow rates scaled up to about 13.38 ml/min and 5.15 liter/min respectively.

A person skilled in the art could identify further variations of the above as well as other parameters.

The temperature during the reaction can be controlled by way of a heat exchanger along the reactor. For example, the reaction can be run at any temperature from approximately 100° C. to 240° C.

As performed in the apparatus herein described, a hydrogenation reaction has a residence time which can be in the range of seconds, such as within 10 seconds. Also, by controlling the flow rates of the reactants and the temperature, it is possible to tailor the degree of hydrogenation. In this way, the nature of the final product can be controlled.

For example, if the reactor is run at a temperature of 240° C. with an oil flow rate of 1.0 ml/min, a catalyst flow rate of 0.293 ml/min and a hydrogen flow rate of 0.345 liters/min we obtain an oil with an IV number of 30.5. If the temperature of the reactor is lowered to 180° C. the IV number increases to 51.5. Similarly, if the temperature is kept the same but the flow rate is increased from 1 ml/min to 4 ml/min, and the proportion of catalyst and hydrogen is kept the same, the IV number of the product increases to 78.2. Since the IV number is a measure of the number of unsaturated bonds in the oil, lower IV numbers mean that the oil is more completely hydrogenated. Therefore, decreasing the oil flow rate will increase the degree of hydrogenation, and increasing the temperature will increase the degree of hydrogenation. Of course all the numbers cited in this disclosure are approximate numbers.

The above system allows very high yields of hydrogenation, but most of all, allows the degree of hydrogenation of the unsaturated fatty acids to be controlled.

P-Xylene Oxidation

The disclosed system allows the selective oxidation of xylene to terephthalic acid (diacid), using pure oxygen as the oxidant, and allows performing this oxidation in various solutions.

Media used in art to perform this oxidation, such as acetic acid, can be used in the disclosed system. In a preferred embodiment, these media are replaced with water. In this way, the process herein disclosed allows reduction of material waste, reduction or elimination of potential pollutants, and reduction or elimination of secondary processing of the TPA to make PTA to remove partially oxydized p-xylene which can carry over as a contaminant.

Using water makes the process cleaner and more environmentally friendly. Additionally, pure oxygen can be used instead of air without decreasing safety thus allowing the safer use of pure oxygen because of the smaller volume of material in process at any given time.

The reactants and the catalyst are introduced into the apparatus in a manner similar as outlined above with reference to the hydrogenation reaction.

The catalyst, which maybe cobalt acetate, can have a concentration between 0.01 and 4 Wt % in the reaction solvent water. The use of cobalt acetate results in a less corrosive catalyst formulation. Traditional catalysts, such as a Co, Mn and Br solutions can be used in the embodiment wherein the solvent is selected among traditional media, preferably in a Ti reactor. Typical catalyst formulations for the Co/Mn/Br catalyst system can have molar ratios of 1/1-5/0.2-1.0 with the cobalt salt concentration in the 0.1 molar range.

In a reactor having a working volume of 7.0 milliliter, the xylene flow rate can be varied between 0.1 and 2.5 ml/min. The reaction temperature can be varied from about 80 to 145° C., the higher temperature being preferred. The initiator can be an active aldehyde and acetaldehyde or valeraldehyde can be used in an approximate 1-2 mol % ratio based on the catalyst concentration. Pure oxygen can be used as the oxidant instead of air and the oxygen ratio can be varied from about 3:1 to about 12:1 oxygen:xylene.

The reactor pressure can be in a range from about 100 to 200 PSIG. The rotor spin rate can be about 5000 rpm and the residence time for the complete reaction mixture under these conditions will vary from less then a minute to about 7 minutes.

In place of water a mixture, of solvents can also be used such as organic/water mixtures or ionic liquids. Organic co-solvents, such as acetonitrile, that are resistant to oxidation are preferred. Ionic liquids, inorganic material with an organic group which are liquid under reaction conditions, are also viable solvents as long as they are not oxidized during the reaction.

The oxidation performed with the system disclosed herein allows a very high yield, i.e. up to 95% conversion.

Hydrogen Peroxide Synthesis

Hydrogen peroxide synthesis is an embodiment of the disclosed reaction process performed in a 3-phase multi-component system, wherein more than two reactants are reacted together with at least one first reactant being in a liquid state and at least one reactant being in a gas state. Oxygen and hydrogen gases can be combined with a solution of DI H2O, NaCl and sulfuric acid in the presence of a catalyst, such as palladium, to form hydrogen peroxide.

Other reactants can be employed in performing this reaction. Suitable reactants include other halide salts, for example NaBr or NaI, other strong acids such as nitric acid and other precious metal catalysts with palladium being preferred. Organic co-solvents can also be used to enhance the gas solubilities.

In one possible embodiment, a solution of DI $H_2O$ NaCl and sulfuric acid constitutes a reactant in liquid phase, while oxygen and hydrogen constitute reactants in gaseous phase. A catalyst, for example in form of a suspension, is also added to the reaction. The DI solution and the reactants can be introduced in the reactor with a process similar to the one described for the other reactions above. Alternatively the hydrogen and oxygen can be mixed before introducing them into the reactor.

The DI solution is preferably introduced in the reactor through the main inlet in the head end, preferably via a pump such as the Quizix High Temp pump. The solution is preferably preheated in the preheated block.

The primary flow rate of the DI solution can be for example 1.3618 ml/min. A solution of glycerin and Pd black is also metered into a different inlet, such as the secondary inlet of the reactor via a pump such as an Isco syringe pump. Between the pump and the reactor, the solution is preferably passed through a pre-heater, such as heater 110 or 116.

The catalyst flow rates can range from 0.015-0.15 l/min. Zero grade oxygen gas can be metered into a tertiary inlet of the reactor via an mass-flow controller. The flow rates may range from about 1.355 to about 1.385 standard liters per minute (SLPM). Ultra high purity hydrogen gas may also be metered into the tertiary inlet of the reactor via another mass-flow controller. The flow rates can range from about 108.8 to about 217.6 standard cubic centimeters per minute (SCCM). Between the controller and the reactor, the gases may pass through a pre-heat heat exchanger before entering the reactor.

Returning to FIG. 3, the illustrated embodiment can be used for an enzyme reaction process. The axis of rotation of the rotor cylindrical member 42 is eccentrically mounted relative to the longitudinal axis of the stator cylindrical member 30, so that the radial processing chamber 44 differs in dimension circumferentially around the rotor. A heat exchange structure is provided having an outer casing 32 and heat exchange material 34, since such processes usually are exothermic and surplus heat must be removed for optimum operative conditions for the microorganisms. A series of oxygen feed inlets 14 are arranged along the length of the stator and the oxygen fed therein is promptly emulsified into the broth, providing uniformly dispersed, micron-fine bubbles instead of being sparged therein with millimiter size bubbles of non-uniform distribution, as with conventional enzyme reaction systems. The carbon dioxide that is produced is vented from the upper part of the processing passage through a vent 56. The reactor according to FIG. 3 is designed to operate continuously and provides a continuous and uniform $CO_2$ removal along the upper portion of the rotor which is constantly wetted with a film of broth of uniform mixedness of all ingredients. Also shown is the port 58 and window 60 as described with reference to FIG. 2.

The apparatus of the disclosure is generically a reactor process and apparatus, and a reactor consists of the vessels used to produce desired products by physical or chemical means, and is frequently the heart of a commercial processing plant. Its configurations, operating characteristics, and underlying engineering principles constitute reactor technology. Besides stoichiometry and kinetics, reactor technology includes requirements for introducing and removing reactants and products, supplying and withdrawing heat, accommodating phase changes and material transfers, assuring efficient contacting among reactants, and providing for catalyst replenishment or regeneration. These issues are taken into account when one translates reaction kinetics and bench-scale data into the design and manufacture of effective pilot plants, and thereafter scale up such plants to larger sized units, and ultimately designs and operates commercial plants.

While the specification describes particular embodiments of the present disclosure, those of ordinary skill can devise variations of the present disclosure without departing from the inventive concept.

We claim:

1. A process for performing a chemical reaction between a first reactant and a second reactant in the presence of a catalyst, the first reactant being in a liquid phase and the second reactant being in a gas phase, the process comprising:
    supplying the first reactant and the second reactant to a passage defined by a first surface and a second surface, the first reactant supplied to the passage by a first reactant flow and the second reactant supplied to the passage by a second reactant flow, wherein the first reactant mixes with the second reactant at least by interdiffusion, the first reactant, the second reactant and any mixture and reaction products thereof, forming respective boundary layers against the first and second surfaces, each boundary layer having a radial thickness;
    providing a radial spacing between the first surface and second surface that is one of (1) a radial spacing not greater than the back-to-back combined radial thicknesses of the boundary layers and (2) a radial spacing greater than the back-to-back combined radial thicknesses with a third layer between the two boundary layers, wherein the third layer is too thin to support at least one of (1) turbulent convection and (2) uneven channeling; and
    reacting the first reactant with the second reactant in the passage.

2. The process of claim 1, further comprising moving at least one of the first surface and second surface relative to each other.

3. The process of claim 2, wherein the radial spacing between the first surface and the second surface in the passage ranges from a first radial spacing to a second radial spacing, the first radial spacing greater than the second radial spacing.

4. The process of claim 1, wherein the chemical reaction is p-xylene oxidation, the first reactant being p-xylene in a solution with a suitable solvent, the second reactant being oxygen.

5. The process of claim 4, wherein the solvent is water.

6. The process of claim 1, wherein the chemical reaction is hydrogenation of unsaturated fatty acids, the first reactant being an oil comprising an unsaturated fatty acid and the second reactant being hydrogen.

7. A process for performing a chemical reaction between a plurality of chemical reactants in the presence of a catalyst, at least a first reactant being in a liquid phase and at least a second reactant being in a gas phase, the process comprising:
    supplying the first reactant and the second reactant to a passage defined by a first surface and a second surface, the first reactant supplied to the passage by a first reactant flow and the second reactant supplied to the passage by a second reactant flow, wherein the first reactant mixes with the second reactant at least by interdiffusion, the first reactant, the second reactant and any mixture and reaction products thereof, forming respective boundary layers against the first and second surfaces, each boundary layer having a radial thickness;
    providing a radial spacing between the first surface and second surface that is one of (1) a radial spacing not greater than the back-to-back combined radial thicknesses of the boundary layers and (2) a radial spacing greater than the back-to-back combined radial thicknesses with a third layer between the two boundary layers, wherein the third layer is too thin to support at least one of (1) turbulent convection and (2) uneven channeling; and reacting the first reactant with the second reactant in the passage.

8. The process of claim 7, further comprising moving at least one of the first surface and second surface relative to each other.

9. The process of claim 8, wherein the radial spacing between the first surface and the second surfaces in the passage ranges from a first radial spacing to a second radial spacing, the first radial spacing greater than the second radial spacing.

10. The process of claim 7, wherein the chemical reaction is p-xylene oxidation, the first reactant being p-xylene in a solution with a suitable solvent, the second reactant being oxygen.

11. The process of claim 10, wherein the solvent is water.

12. The process of claim 7, wherein the chemical reaction is hydrogenation of unsaturated fatty acids, the first reactant being an oil comprising an unsaturated fatty acid and the second reactant being hydrogen.

13. A process for performing a chemical reaction between a first reactant and a second reactant in the presence of a catalyst, the first reactant being in a liquid phase and the second reactant being in a gas phase, the process comprising:

introducing the first reactant and the second reactant into an apparatus comprising a first surface and a second surface able to move relative to each other, the first surface and second surface defining a passage, the first reactant reacting with the second reactant in the passage, the first reactant, the second reactant and any mixture and reaction product thereof forming respective boundary layers against the first and second surfaces, each boundary layer having a radial thickness;

providing a radial spacing between the first surface and second surface that is one of (1) a radial spacing not greater less than the back-to-back combined radial thicknesses of the boundary layers and (2) a radial spacing greater than the back-to-back combined radial thicknesses with a third layer between the two boundary layers, wherein the third layer is too thin to support at least one of (1) turbulent convection and (2) uneven channeling; and moving at least one of the first surface and the second surface relative to the other.

14. The process of claim 13, wherein the radial spacing between the first surface and the second surfaces in the passage ranges from a first radial spacing to a second radial spacing, the first radial spacing greater than the second radial spacing.

15. The process of claim 13, wherein the catalyst is introduced into the apparatus in a solid phase.

16. The process of claim 13, further comprising bringing at least one of the first reactant and the second reactant to a predetermined temperature, before introducing the first reactant and the second reactant into the apparatus.

17. The process of claim 16, wherein bringing at least one of the first reactant and second reactant to a predetermined temperature is performed by passing at least one of the first reactant and second reactant through a pre-heater device connected to the apparatus.

18. The process of claim 13, wherein the apparatus has a head end and a body, a first inlet located on the head end and a second inlet located on the body, the first reactant introduced in the apparatus through the first inlet, the second reactant introduced in the apparatus through the second inlet.

19. The process of claim 14, wherein the apparatus has a head end and a body, a first inlet located on the head end and a second inlet located on the body, the second inlet connected to a portion of the passage having the second radial spacing.

20. The process of claim 13, wherein introducing the first reactant and the second reactant is performed contemporaneously with moving at least one of the first surface and the second surface.

21. The process of claim 13, wherein the chemical reaction is p-xylene oxidation, the first reactant being p-xylene in a solution with a suitable solvent, the second reactant being oxygen.

22. The process of claim 21, wherein the solvent is water.

23. The process of claim 13, wherein the chemical reaction is hydrogenation of unsaturated fatty acids, the first reactant being an oil comprising an unsaturated fatty acid and the second reactant being hydrogen.

24. A process for performing a chemical reaction between a plurality of chemical reactants in presence of a catalyst, at least one reactant being in a liquid state and at least one reactant being in a gas state, the process comprising:

introducing the first reactant and the second reactant into an apparatus comprising a first surface and a second surface with at least one of said surfaces able to move relative to the other, the first surface and second surface defining a passage, the first reactant reacting with the second reactant in the passage, the first reactant, the second reactant and any mixture and reaction product thereof forming respective boundary layers against the first and second surfaces, each boundary layer having a radial thickness;

providing a radial spacing between the first surface and second surface that is one of (1) a radial spacing not greater than the back-to-back combined radial thickness of the boundary layers and (2) a radial spacing greater than the back-to-back combined radial thicknesses with a third layer between the two boundary layers, wherein the third layer is too thin to support at least one of (1) turbulent convection and (2) uneven channeling; and moving at least one of the first surface and the second surface relative to the other.

25. The process of claim 24, wherein the radial spacing between the first surface and the second surface ranges from a first radial spacing to a second radial spacing, the first radial spacing being greater than the second radial spacing.

26. The process of claim 24, further comprising bringing at least one the reactants to a predetermined temperature, before introducing the first reactant and the second reactant into the apparatus.

27. The process of claim 24, wherein the chemical reaction is formation of hydrogen peroxide, the reactants comprising oxygen and hydrogen gases, a glycerine solution and a solution one DI H20.

* * * * *